J. E. MUHLFELD.
JOURNAL BEARING FOR CAR AND OTHER AXLES.
APPLICATION FILED APR. 9, 1909.
985,438.
Patented Feb. 28, 1911.
2 SHEETS—SHEET 2.
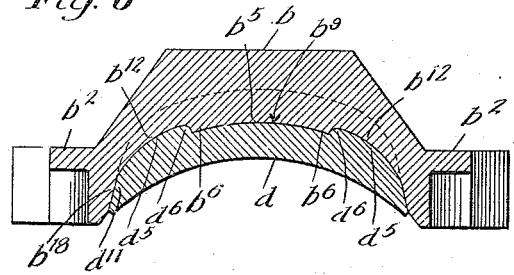
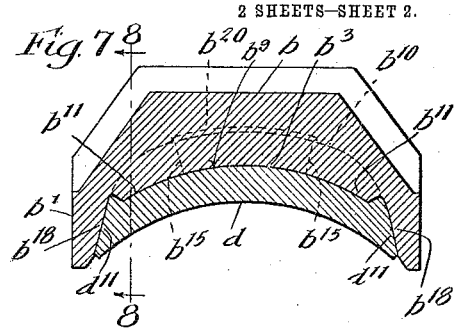
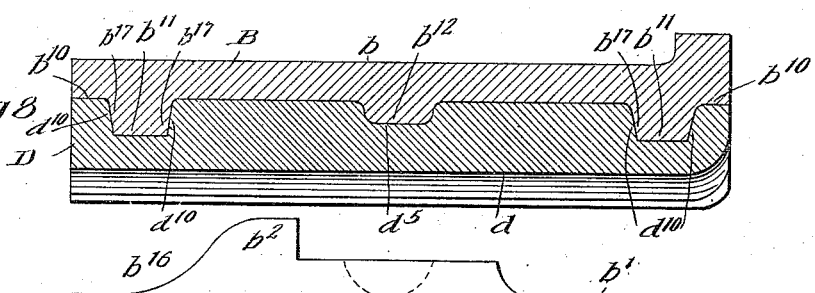
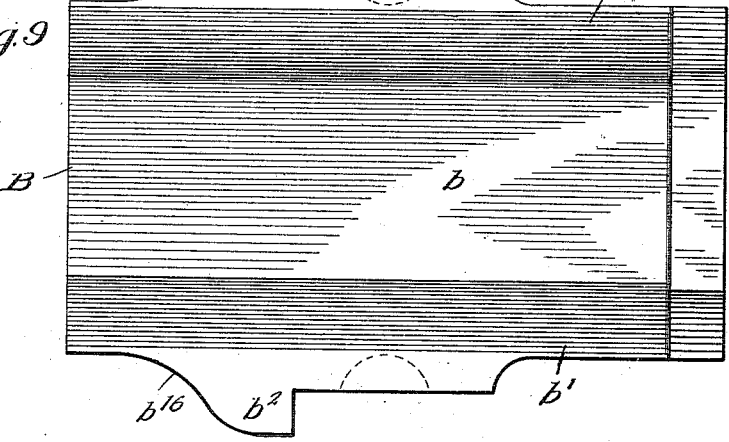
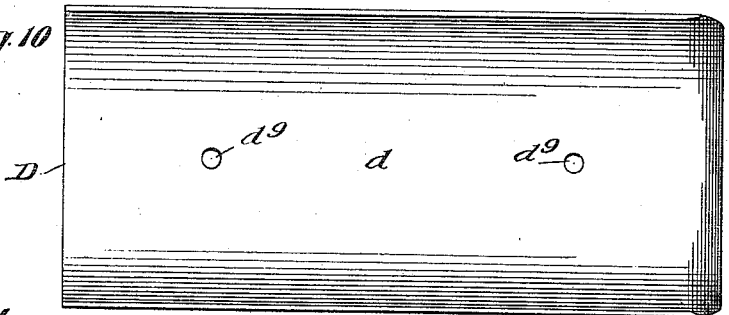
Witnesses:
Wm. Geiger
H. W. Munday
Inventor,
John E. Muhlfeld
By Munday, Evarts, Adcock & Clarke
Attorneys
THE NORRIS PETERS CO., WASHINGTON, D. C.

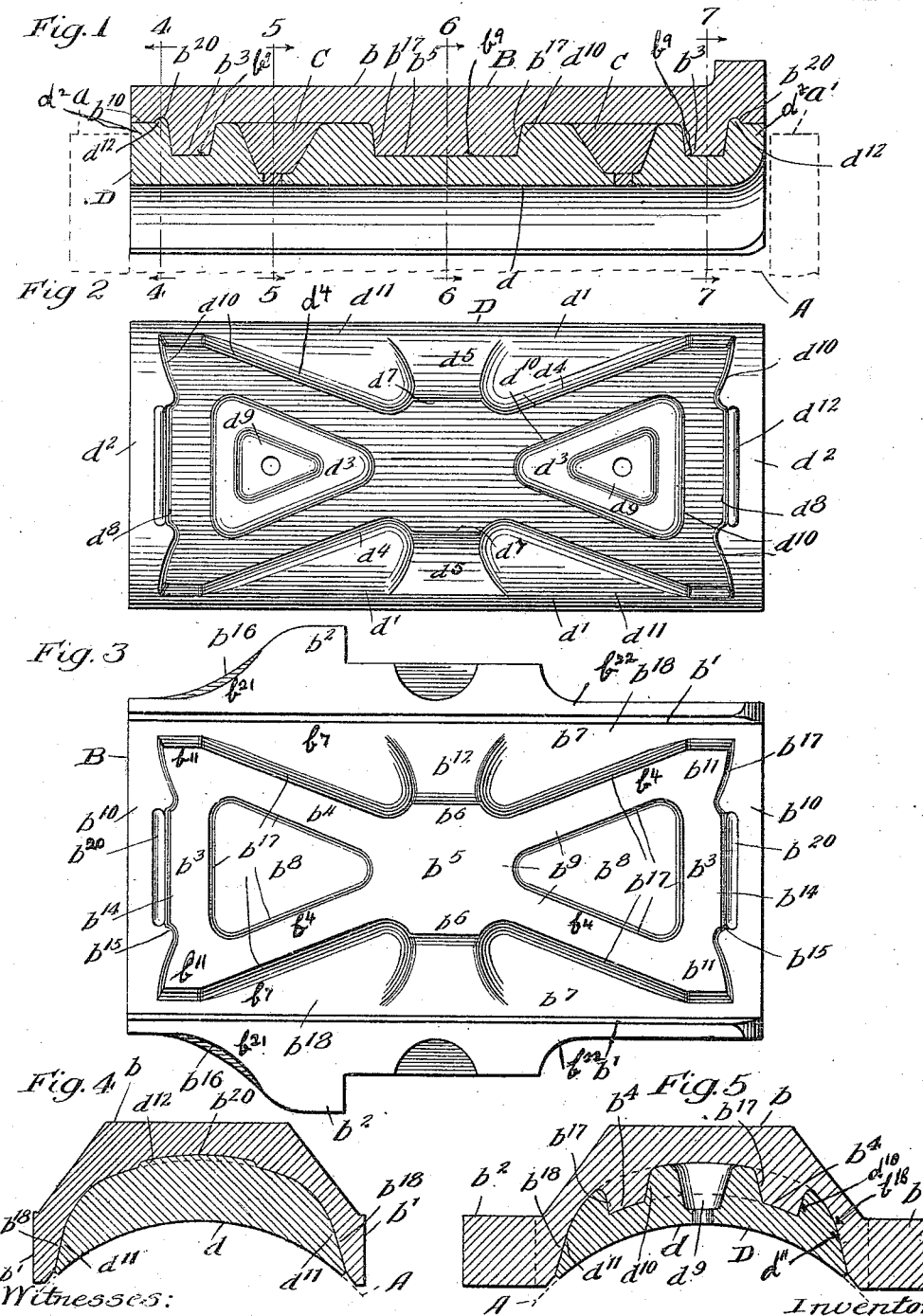

UNITED STATES PATENT OFFICE.

JOHN E. MUHLFELD, OF BALTIMORE, MARYLAND.

JOURNAL-BEARING FOR CAR AND OTHER AXLES.

985,438.

Specification of Letters Patent. Patented Feb. 28, 1911.

Application filed April 9, 1909. Serial No. 488,788.

*To all whom it may concern:*

Be it known that I, JOHN E. MUHLFELD, a citizen of the United States, residing in the city of Baltimore and State of Maryland, have invented a new and useful Improvement in Journal-Bearings for Car and other Axles, of which the following is a specification.

My invention relates to improvements in journal bearings for car and other axles, and more particularly to improvements upon the journal bearings of my Patents Nos. 866,154 of Sept. 17th, 1907, 904,634 of Nov. 24th, 1908 and 905,088 of Nov. 24, 1908, and of my pending application, Ser. No. 459,824, filed October 28th, 1908.

The object of my present improvement is to perfect the journal bearings of my said pending application and patents, and to simplify the same in details of construction, tending to reduce the cost of manufacture without interfering with the efficiency of the journal bearing in operation.

My invention consists in the novel form and construction of the brass or main bearing metal shell with its longitudinally and transversely extending bearing ribs and central cavities and surrounding channels, and of the coöperating removable soft metal liner shell and its central and marginal side and end ribs or thickened portions and intervening channels or recesses as herein shown and described and more particularly specified in the claims.

In my present improvement, the longitudinal extending bearing ribs of the main shell are bent, deflected or inclined toward each other at their middle portions instead of extending straight or parallel, as in my said pending application and former patents, and the middle or intermediate transverse bearing rib is made materially wider to further strengthen or stiffen the main shell against spreading, and the interengaging upright keying shoulders or lugs on the transversely extending end bearing ribs of the main shell, and on the extreme end ribs of the soft metal or liner shell are made the reverse of the construction shown in my said pending application. That is to say, the upright central recess is formed in the marginal end rib of the soft metal or liner shell instead of in the transverse end bearing rib of the main shell, as in the construction shown in my said pending application, the end bearing rib of the main shell having a corresponding central upright lug or projection.

In the accompanying drawing forming a part of this specification, Figure 1 is a central, vertical longitudinal section of a journal bearing embodying my invention. Fig. 2 is a detail plan view of the separate piece removable soft metal liner shell. Fig. 3 is a detail bottom plan view of the main bearing metal shell. Figs. 4, 5, 6 and 7 are vertical cross sections on lines 4—4, 5—5, 6—6 and 7—7 of Fig. 1. Fig. 8 is a longitudinal vertical section on line 8—8 of Fig. 7. Fig. 9 is a top or plan view of the bearing and Fig. 10 is a bottom plan view of the removable liner shell.

In the drawing, A represents the journal of a car or other axle having the customary collar $a$ and shoulder $a^1$.

My improved journal bearing comprises a main shell B of a hard, strong bearing metal, such, for example, as brass, and a separate piece removable soft bearing metal or liner shell D, of any suitable bearing metal, such, for example, as a composition of lead and antimony, Babbitt or the like.

The main shell B has the customary upper key contact face $b$, side walls $b^1$ and side lugs $b^2$. The main shell B is provided on its under face with end bearing ribs $b^3$ and inwardly bent or inclined longitudinally extending bearing rib $b^4$ and an intermediate or middle transversely extending and connecting broad bearing rib $b^5$, the ends $b^6$ of which intermediate rib project slightly beyond the outer edges of said longitudinally extending bearing ribs $b^4$; the transversely extending end bearings ribs $b^3$ intersecting and connecting at the corners with the inclined or bent and longitudinally extending bearing ribs $b^4$ and the broad intermediate bearing rib $b^5$ intersecting and connecting with the longitudinal bearing ribs $b^4$ at the middle portions thereof where their inward bends cause them to approach each other, and all said bearing ribs having concave bearing faces for contacting with the journal when the liner shell D becomes worn away, or when it melts and flows out from a hot box. The main shell B is also provided with side channels $b^7$ and intermediate central depressions or cavities $b^8$, said central depressions or cavities $b^8$ being of a substantially triangular form. The concave bearing faces $b^9$ of the bearing ribs $b^3$ $b^4$ $b^5$ are concentric or struck on the same circle, and suitably dressed or turned. The main shell B also has at its extreme ends transversely extending end channels $b^{10}$ which are made as deep as the central depressions or cavities $b^8$. The transversely extending end bearing ribs $b^3$ at each end of the main bearing shell are preferably furnished with extensions $b^{11}$ connecting with the side walls $b^1$ of the main shell, and at its middle portion transversely extending thickened portions or shallow ribs $b^{12}$ extend from the side walls of the main shell to the extensions $b^6$ of the intermediate bearing rib $b^5$ to strengthen and brace the main shell against spreading. The transversely extending end bearing ribs $b^3$ of the main shell are also provided in their outer upright end faces with an upright central lug or projection $b^{14}$ and upright shoulders $b^{15}$, which upright lug or projection $b^{14}$ fits in the corresponding recess in the transversely extending end rib of the soft metal or liner shell D, and which shoulders $b^{15}$ interfit with and engage corresponding shoulders on said end rib of the soft metal liner shell to prevent the soft metal of said end rib of the liner shell from flowing or crawling or squeezing out under the end thrust and frictional rolling action of the journal collar or shoulder against the extreme end ribs of said soft metal liner shell. The side walls of the main shell B on the outside thereof are furnished with tapering enlargements or reinforcements $b^{16}$ $b^{21}$ $b^{22}$ at the end portions thereof to further stiffen and strengthen the main shell and further adapt it to overcome any tendency to spread at the ends.

The soft metal liner shell D has a concave bearing face $d$ conforming or adapted to conform to the curvature of the journal and it is provided on its upper face with marginal side ribs $d^1$, end ribs $d^2$ and central lugs or thickened portions $d^3$, said central lugs or thickened portions being preferably of substantially triangular form. The marginal side ribs $d^1$ of the liner shell D have inwardly bent or inclined inner faces $d^4$ to fit the corresponding inward bend or inclination of the longitudinally extending bearing ribs $b^4$ of the main shell. The marginal side ribs $d^1$ of the soft metal or liner shell D each have at their middle portion a notch or depression $d^5$ to receive and accommodate the corresponding transversely extending middle, shallow, stiffening rib $b^{12}$ of the main shell, and with a further notch or depression $d^7$ to receive and accommodate the projecting extension $b^6$ of the transversely extending intermediate broad bearing rib $b^5$ of the main shell. The marginal end ribs $d^2$ of the liner shell D are furnished at the crown portions thereof with keying or holding recesses $d^8$ to receive the corresponding upright keying lugs or projections $b^{14}$ on the end faces of the end bearing ribs $b^3$ of the main shell B. The central lugs or thickened portions $d^3$ of the liner shell D are also furnished with downwardly flaring openings $d^9$ to receive a hard or solid lubricant C, said downwardly flaring openings $d^9$ being preferably substantially triangular in shape, corresponding to the substantially triangular form of the central lugs or thickened portions $d^3$ of the liner shell D. The abutment faces $d^{10}$ of the marginal side ribs $d^1$, end ribs $d^2$ and central lugs $d^3$ of the liner shell D, which interfit with and engage the corresponding abutment faces $b^{17}$ of the bearing ribs $b^3$ $b^4$ $b^5$ of the main shell, are all substantially upright but slightly flaring or tapering so that the liner shell D may be freely removed from and replaced in the main shell B, while at the same time presenting numerous interengaging abutment faces of the two shells of aggregate extensive area, and thus to securely anchor the removable liner shell in the main shell and prevent it from squeezing, flowing or crawling out either transversely under the rolling action of the journal or longitudinally under the end thrust of the journal collar and shoulder. The outer abutment faces $d^{11}$ on the liner shell D which are embraced by the inner abutment faces $b^{18}$ of the depending sides or walls $b^1$ of the main shell are also slightly tapering while substantially upright, so as to permit the liner shell D to be readily removed from the main shell B, and at the same time serve to confine and hold in place the soft metal of the liner shell against the rolling action of the journal. The transversely extending end ribs $d^2$ of the liner shell D at the crown portion thereof are preferably furnished with upwardly projecting keying or holding lugs $d^{12}$ which fit in corresponding keying or holding recesses $b^{20}$ in the main shell B adjacent to the keying lugs $d^{12}$ thereof to further aid in preventing the end ribs $d^2$ of the liner shell from displacement or crawling or squeezing out under the rolling and end thrust action of the journal collar and shoulder.

I claim:—

1. A journal bearing comprising in combination a main shell of hard, strong bearing metal, and a separate piece removable liner shell of soft bearing metal, said main shell having narrow longitudinally extending bearing ribs and transversely extending end bearing ribs on its under face at its crown portion, and transversely extending channels at its extreme ends, and said main shell having side walls embracing and confining the liner shell at its outer edges, the longitudinally extending bearing ribs of said main shell being inclined toward each other from each end toward the middle, said liner shell having transversely extending marginal end ribs embracing the outer recessed ends of the main shell, marginal side ribs, and central lugs fitting between said bearing ribs of the main shell, said transversely extending end bearing ribs of the main shell having each on its outer upright face an upright central keying lug, and said marginal end ribs of the liner shell having each a corresponding recess to receive said keying lug, and said marginal end ribs of the liner shell having each on its upper face an upwardly projecting keying lug, and the main shell having at its channeled ends keying recesses to receive said upwardly projecting keying lugs on the end ribs of the liner shell, substantially as specified.

2. A journal bearing comprising in combination a main shell of hard, strong bearing metal, and a separate piece removable liner shell of soft bearing metal, said main shell having narrow longitudinally extending bearing ribs and transversely extending end bearing ribs on its under face at its crown portion and transversely extending channels at its extreme ends, and said main shell having side walls embracing and confining the liner shell at its outer edges, the longitudinally extending bearing ribs of said main shell being inclined toward each other from each end toward the middle, said liner shell having transversely extending marginal end ribs embracing the outer recessed ends of the main shell, marginal side ribs and central lugs fitting between said bearing ribs of the main shell, said marginal end ribs of the liner shell having upwardly projecting keying lugs, and the main shell having corresponding recesses to receive said keying lugs, substantially as specified.

JOHN E. MUHLFELD.

Witnesses:
H. H. HOUCK,
AUGUSTUS W. BRADFORD.

---

Copies of this patent may be obtained for five cents each, by addressing the "Commissioner of Patents, Washington, D. C."